(12) United States Patent
Church

(10) Patent No.: US 7,559,444 B1
(45) Date of Patent: Jul. 14, 2009

(54) QUICK RELEASE RACK FOR HUNTING BOWS

(76) Inventor: Richard H. Church, 1525 E. Skyline Dr., Cottonwood, AZ (US) 86326

( * ) Notice: Subject to any disclaimer, the term of this patent is extended or adjusted under 35 U.S.C. 154(b) by 785 days.

(21) Appl. No.: 11/072,881

(22) Filed: Mar. 4, 2005

(51) Int. Cl.
*B60R 7/00* (2006.01)

(52) U.S. Cl. ........................ 224/401; 224/405

(58) Field of Classification Search ............ 224/405, 224/401, 922, 443; 211/64, 124, 7
See application file for complete search history.

(56) References Cited

U.S. PATENT DOCUMENTS

| | | | | |
|---|---|---|---|---|
| 5,595,333 | A | 1/1997 | Boston | 224/536 |
| 5,641,106 | A | 6/1997 | Slaughter et al. | 224/324 |
| 5,725,106 | A | 3/1998 | Wilson | 211/13.1 |
| 5,791,610 | A * | 8/1998 | Sanchez | 224/916 |
| 6,199,734 | B1 * | 3/2001 | Meeks | 224/401 |
| 6,641,014 | B2 | 11/2003 | McNally | 224/405 |
| 6,691,877 | B1 | 2/2004 | Ohm | 211/85.7 |
| 6,902,089 | B2 * | 6/2005 | Carnevali | 224/553 |
| 2002/0060232 | A1 * | 5/2002 | Stenger et al. | 224/401 |

OTHER PUBLICATIONS

Big Horn Mfg. "PRO-DRAW". Webpage downloaded Dec. 21, 2004.
Website: ATV Power Pack Bow Holder: An investment in protection (2 pages), Webpage downloaded Jan. 4, 2006.
Website: Power Pak ATV Bow Hodler (2 pages), Webpage downloded Jan. 4, 2006.
Website: Sportsman's Guide re ATV Power pack Bow Holder with accompanying photographs (3 pages), Webpage downloaded Jan. 3, 2006.

* cited by examiner

*Primary Examiner*—Nathan J Newhouse
*Assistant Examiner*—Lester L Vanterpool
(74) *Attorney, Agent, or Firm*—The von Hellens Law Firm, Ltd.

(57) ABSTRACT

An ATV mounted rack includes a pair of rotatable U-shaped uprights biased toward a first position. Upon manual pivotal movement of a handle interconnected with the uprights through linkages, the handle will cause the U-shaped uprights to rotate toward a second position for receiving or releasing a hunting bow, rifle, shotgun or other equipment. Release of the handle will cause the U-shaped uprights to rotate toward the first position until further rotation is halted by engagement of the arms of the U-shaped uprights with a received hunting bow, rifle, shotgun or other equipment.

3 Claims, 2 Drawing Sheets

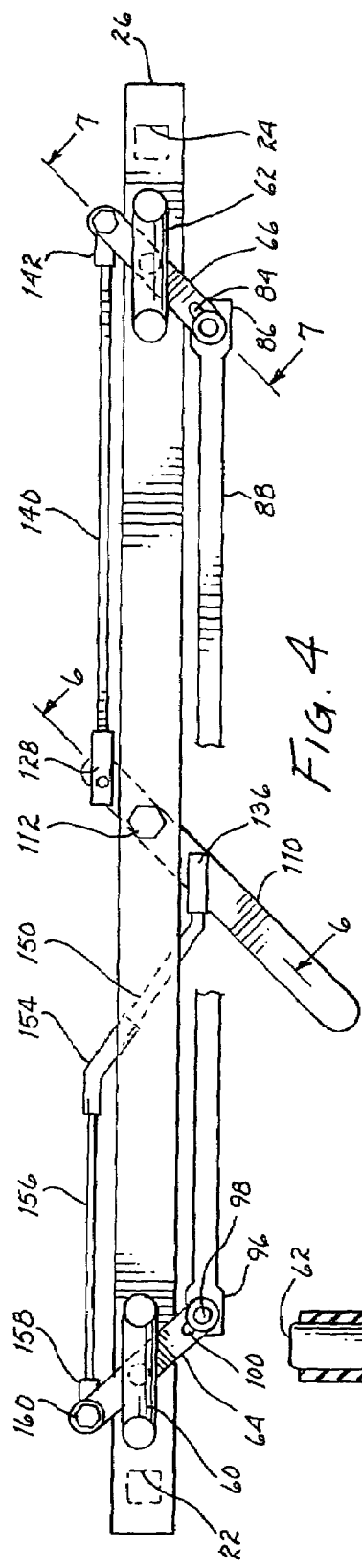

QUICK RELEASE RACK FOR HUNTING BOWS

BACKGROUND OF THE INVENTION

1. Field of the Invention

The present invention relates to quick release racks for hunting equipment and, more particularly, to a quick release rack detachably attachable to a vehicle for supporting a hunting bow.

2. Description of Related Prior Art

During travel by a hunter to or from a hunting area or within a hunting area, hunting bows or rifles usually accompany the hunter. During such travel, the hunting bow or rifle may be lodged within an appropriately configured case. Such a case may be soft sided or hard sided. The vehicles usually used by the hunter are generally known as all terrain vehicles (ATV) but other more conventional two wheel or four wheel drive vehicles may also be used.

As the hunter(s) is traveling to or from a campground, blind or while searching for the game being hunted, the game may be spotted at a distance close enough to warrant an attempt to shoot the game. If the hunting bow or rifle is within a case, it will take a period of time to open the case and retrieve the hunting bow or rifle. Moreover, such retrieval will cause noise and the game may become alerted and run off out of range or out of sight.

To overcome the problems attendant carrying a hunting bow or a rifle within a protective case, the hunting bow or rifle may be placed in a vehicle at a location wherefrom it is easily retrievable. A loose hunting bow or rifle will become jostled by movement of the vehicle over rough terrain and even over smooth terrain. Such jostling may cause damage and is likely to affect the alignment of the sights to the detriment of accuracy.

Gun racks of the type used for decades in the cab of a pick up truck tend to protect a mounted rifle. However, the hunter has to step outside the cab and thereafter retrieve the rifle, which creates noise from opening the door of the cab along with the action of retrieving the rifle. Racks of this type are generally not suitable for hunting bows due to the configuration of the bows and various sighting instruments normally attached thereto.

SUMMARY OF THE INVENTION

A quick release rack for supporting a hunting bow is detachably attachable to super structure mounted upon an all terrain vehicle in front of the driver. The rack includes a pair of upwardly extending U-shaped pivotable uprights displaced from one another for receiving therewithin the hunting bow. Each of the uprights is biased to pivot approximately ninety degrees. A pivotable lever accessible to the driver of the all terrain vehicle is angularly translated to cause pivotal movement of the uprights to permit insertion and removal of the hunting bow therewithin. Upon release of the lever, the uprights will tend to pivot until restrained by the received and engaged part of the hunting bow. Such restraint will serve in the manner of a retainer to prevent removal of the hunting bow from within the respective uprights.

It is therefore a primary object of the present invention to provide a vehicle mounted lever operated rack for releasably retaining a hunting bow or a rifle.

Another object of the present invention is to provide a rack for a hunting bow mountable in front of and accessible to the driver of an all terrain vehicle.

Still another object of the present invention is to provide a pair of pivotally biased U-shaped uprights for receiving and retaining a hunting bow.

Yet another object of the present invention is to provide a pair of U-shaped uprights pivotally biased to retain a hunting bow and a pivotable lever for pivoting the U-shaped uprights to permit removal and subsequent insertion of the hunting bow.

A further object of the present invention is to provide a vehicular mounted rack for supporting and retaining a hunting bow or rifle readily accessible by the driver of an all terrain vehicle to release the retained hunting bow or rifle by pivotal movement of a lever.

A yet further object of the present invention is to provide a method for transporting a hunting bow or rifle on a quick release rack supported by an all terrain vehicle.

A still further object of the present invention is to provide a quick release vehicular mounted rack actuatable by a single lever to release the grip on a supported hunting bow or rifle.

These and other objects of the present invention will become apparent to those skilled in the art as the description there proceeds.

BRIEF DESCRIPTION OF THE DRAWINGS

The present invention will be described with greater specificity and clarity with reference to the following drawings, in which:

FIG. 4 is a top view of the rack;

FIG. 5 is a further top view of the rack and illustrating actuation of a pivotable lever;

FIG. 6 is a cross sectional view taken along lines 6-6, as shown in FIG. 4; and

FIG. 7 is a cross sectional view taken along lines 7-7, as shown in FIG. 4.

DESCRIPTION OF THE PREFERRED EMBODIMENT

Figure 1:
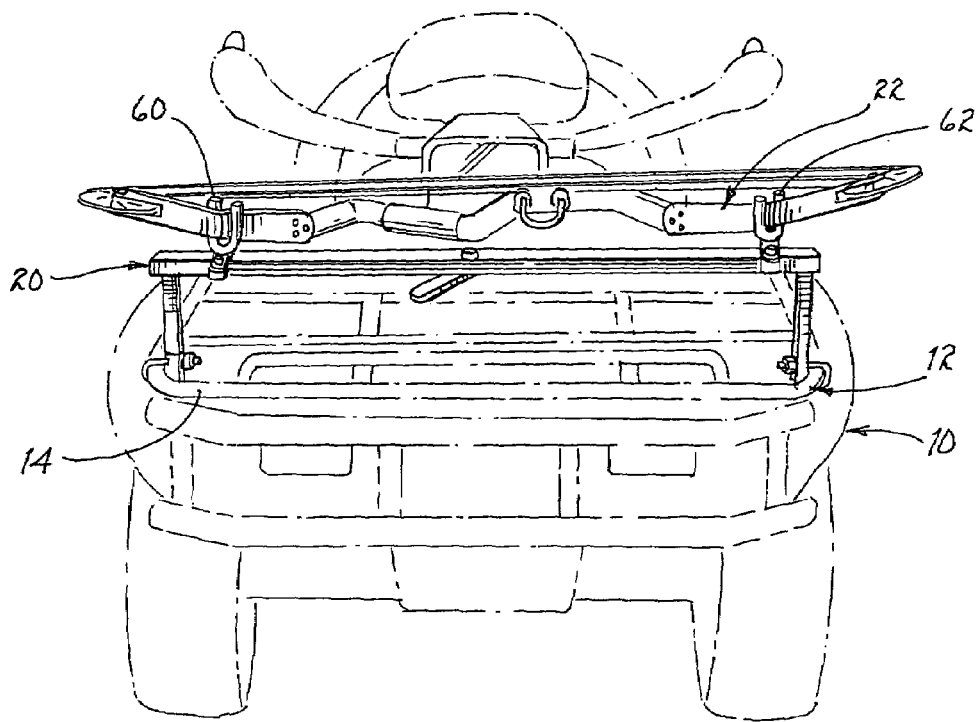
FIG. 1 is a front view of an all terrain vehicle having a quick release rack mounted thereon.

FIG. 1 illustrates in representative form an all terrain vehicle (ATV) 10 of the type used by outdoors men for traversing the countryside. Quite often, ATVs are used by hunters to travel to and from a camp or the location of a hunt. Furthermore, ATVs are often used in search of the game being hunted.

During such travels with an ATV, the hunter or hunters carry either hunting bows or rifles. Because of the rough terrain over which the travel occurs, it is important to keep any such hunting bows or rifles protected to prevent damage thereto and to prevent misalignment of any of the attendant sights or attendant mounted sighting devices of various types. Protection is usually afforded by hard side cases carried in or on the ATV. However, when game is sighted, the hunter usually does not have sufficient time to retrieve the hunting bow or rifle from within its carrying case before the game is out of range or out of sight as a result of being spooked or frightened by the noises attendant retrieval of the hunting bow or rifle.

To overcome this predicament, various rack type devices have been developed which are attached to the vehicle and support a hunting bow or rifle. Most of these known types of racks suffer from an inability to protect the hunting bow or rifle while mounted in the rack or require a relatively time consuming effort to remove the hunting bow or rifle from the rack.

Most conventional ATVs, such as ATV 10 illustrated in FIG. 1, include either as original equipment or as an add-on a superstructure 12 attached to the front of the ATV for supporting various pieces of equipment mechanically attached to or strapped on the super structure. Such superstructure may include a U-shaped bar 14, as illustrated. Rack 20 is rigidly attached to this bar, as will be described below. As illustrated, the rack supports a hunting bow 22. While a hunting bow is illustrated, it is to be understood that the rack can also support a rifle, shotgun and other pieces of equipment, whether used directly or indirectly in pursuit of a hunting or non hunting activity.

Figure 2:
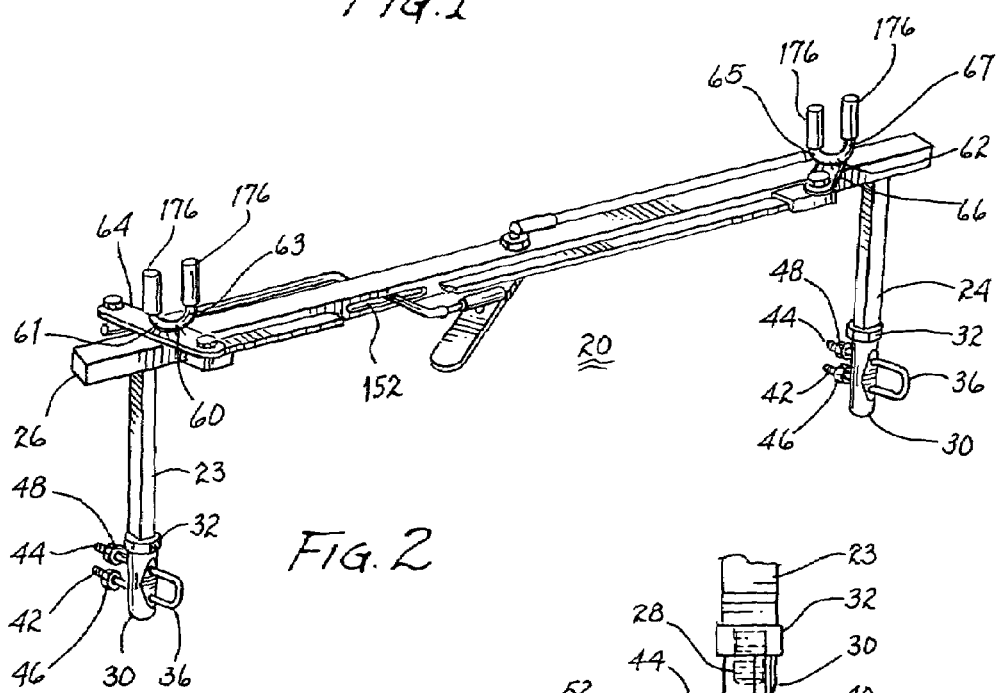
FIG. 2 is an isometric view of the rack.
Figure 3:
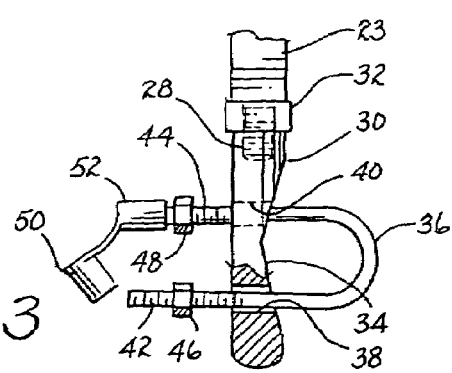
FIG. 3 illustrates further detail attendant the mechanism for attaching the rack to super structure of a vehicle.

Referring jointly to FIGS. 2 and 3, further details of rack 20 will be described. A pair of stanchions 23, 24 extend downwardly from tube 26. Each of the stanchions is terminated by a threaded end 28. A foot 30 is in threaded engagement with the threaded end and lock nut 32 secures the foot in place. The foot may include a depression 34 for receiving and becoming positionally fixed with respect to bar 14 (see FIG. 1). To secure the foot with the bar, a U-shaped link 36 penetrably engages the foot through a pair of passageways 38, 40 disposed on opposed sides of the center of depression 34. The link includes threaded ends 42, 44 for threaded engagement with nuts 46, 48. By placing bar 14 (see FIG. 1) within link 36 and sliding threaded ends 42, 44 through respective passageways 38, 40, the bar is captured within the link and adjacent the depression. By tightening nuts 46, 48 upon threaded ends 42, 44 foot 30 becomes locked upon the bar and movement between the foot and the bar will be precluded. To protect threaded ends 42, 44 and to prevent the threaded ends from scratching a person or a piece of equipment, a pair of caps 50, 52 may be placed thereover, as illustrated.

Referring primarily to FIGS. 2, 4, 6 and 7, further details of rack 20 will be described. A pair of U-shaped uprights 60, 62, including arms 61,63 and 65, 67, respectively, may be welded as shown by weld 70 in FIG. 7 or otherwise secured to respective straps 64, 66. A threaded shaft 68 extends downwardly from each of straps 64, 66 through an aperture 72 in tube 26 and into the tube. A nut 74 is in threaded engagement with shaft 68; access to the nut to threadedly engage it and to tighten it is possible through hole 75 in the bottom of the tube. A washer 76 is penetrably engaged by the threaded shaft and is disposed intermediate strap 66 and tube 26 to accommodate rotation of the strap relative to the tube. While these features are shown primarily in FIG. 7 with respect to upright 62, it is to be understood that similar structure exists with respect to upright 60.

A bolt 80 in penetrable engagement with washer 82 extends through aperture 84 at one end of strap 66. An apertured end 86 of a resilient flexible rubber strap 88 is in penetrable engagement with the bolt and retained thereon by nut 90. It is to be understood that the rubber strap could be replaced by a coil spring or other bias means for urging pivotal movement of the straps to a first position, as described in further detail below. As particularly shown in FIG. 4, aperture 84 may be elongated to provide in the nature of a sloppy link for attachment of strap 88. Washers 92, 94 may be disposed on either side of end 86, as illustrated. End 96 of strap 88 is similarly secured to strap 64 with a bolt 98 in penetrable engagement with elongated aperture 100.

Referring to FIG. 4, rubber strap 88 has become elongated upon attachment of ends 86, 96 to the respective straps. The resulting tension in the rubber strap will cause straps 64, 66 to pivot toward one another. Such pivotal movement of straps 64, 66 will cause the pair of arms of the respective uprights 60, 62 to be essentially aligned with the longitudinal axis of tube 26.

As shown in FIGS. 4, 5 and 6, a handle 110 is pivotally attached to tube 26 by a bolt 112 extending through aperture 114 in handle 110 and apertures 114, 118 in tube 26. The bolt is retained in place by nut 120. Washers 122, 124 may be disposed on opposed sides of handle 110 to reduce the friction upon pivotal movement of the handle about the longitudinal axis of bolt 112. A commercially available fitting 125 is secured to handle 110 by a nut 126. This fitting includes a ball 127 captured by rod end 128. A similar fitting 130 is secured to handle 110 on the other side of tube 26 by a nut 132. This fitting also includes a ball 134 for engagement by a rod end 136.

As particularly shown in FIG. 4, rod end 128 supports a rod 140 terminated on the other end by a rod end 142. As shown in FIG. 7, a fitting 144 secured to strap 66 by nut 146 includes a ball 148 for engagement with rod end 142. Rod end 136 secured to handle 110, is attached to a rod 150 bent to pass through tube 26 through a slot 152 on one side of tube 26 and a similar slot (unnumbered) on the other side of the tube. A coupling 154 may be used to interconnect rod 150 with a further rod 156. A rod end 158 is disposed at the end of rod 156 for engagement with a ball of a fitting similar to fitting 125 shown in FIG. 6 that is retained in place by a nut 160. Thus, linkages interconnect the handle with the respective straps.

When handle 110 is pivoted counter clockwise, as represented by arrow 170, rod 140 will be translated to the left as depicted by arrow 172. Similarly, rod 156 will be translated to the right as depicted by arrow 174. Such movement of these rods will result in pivotal movement of strap 66 in a counterclockwise direction and pivotal movement of strap 64 in a clockwise direction. The result of such pivotal movement of these straps will provide commensurate pivotal movement of uprights 60, 62. As handle 110 is moved counterclockwise as illustrated by arrow 170, the resulting pivotal movement of upright 60, 62 and pairs of arms 61, 63 and 65, 67 will permit the placement of a hunting bow, as illustrated in FIG. 1. It is to be noted that such pivotal movement of the handle will be resisted by rubber strap 88 as it is caused to extend as a result of the pivotal movement of straps 62 and 64. When handle 110 is permitted to pivot in the opposite direction under the tension force exerted by rubber strap 66, upright 60, 62 will be urged to resume the orientation illustrated in FIG. 4. However, if a hunting bow has been placed within uprights 60, 62 the engagement of the respective arms of the uprights with the hunting bow will preclude further movement. The resulting force caused by rubber strap 88 on the pair of uprights to resume the quiescent position shown in FIG. 4 will have the effect of gripping the hunting bow placed therein. As particularly noted in FIG. 2, the arms of each of uprights 60, 62 may include sleeves 176 of rubber or plastic material to prevent marring and scarring of the engaged parts of the hunting bow.

In summary, FIG. 4 illustrates uprights rotated to a first position urged by the bias provided by rubber strap 88. Movement of handle 110, as shown in FIG. 5, will cause the uprights to rotate to a second position for receiving or withdrawing a hunting bow, rifle, shotgun or other equipment, as shown in FIG. 1. Upon release of the handle, the bias provided by rubber straps 88 will urge the uprights to rotate toward the first position. Such rotation will cause the arms of the uprights to bear against opposed sides of the hunting bow, etc. placed therein and grip the hunting bow, etc. to retain it.

While rack 20 was developed primarily for purposes of supporting a hunting bow at the front of an ATV, as illustrated in FIG. 1, it is to be understood that it may equally well retain a rifle, shotgun or other device used for hunting purposes. Moreover, it can also be used to retain one or more elongated elements of any nature that might be useful for the person or persons traveling in the ATV.

I claim:

1. A rack (20) mountable on a vehicle (10), for supporting a hunting bow (22), said rack (20) comprising in combination:
   a) a tube (26);
   b) a pair of stanchions (23, 24) extending from said tube (26) for mounting said rack (20) on the vehicle (10);
   c) a pair of rotatable U-shaped uprights (60, 62) for receiving and retaining the hunting bow (22), each U-shaped upright of said pair of U-shaped uprights (60, 62) being attached to and extending from a rotatably mounted strap (64, 66), including a first linkage (156) interconnecting one of said straps (64) with a handle (110) and a second linkage (140) interconnecting the other of said straps (66) with said handle (110), one of said first and second linkages (156, 140) extending through said tube (26);
   d) bias means (88) for urging rotation of each upright of said pair of U-shaped uprights (60, 62) to a first position; and
   said pivotable handle (110) for rotating said pair of uprights (60, 62) to a second position to receive and remove the hunting bow (22).

2. A method for supporting a hunting bow (22) in a rack (20) attached to a vehicle (10), said method comprising the steps of:
   a) urging rotation of a pair of rotatable U-shaped uprights (60, 62) toward a first position and wherein each of the U-shaped uprights (60, 62) is attached to and extends from a pivotally mounted strap (64, 66) and wherein said step of urging includes the step of pivotally repositioning the straps (64, 66) in opposite directions;
   b) pivoting a handle (110) about a pivot axis in a first direction to cause rotation of the U-shaped uprights (60, 62) toward a second position;
   c) inserting the hunting bow (22) into engagement with the U-shaped uprights (60, 62) upon exercise of said pivoting step;
   d) accommodating pivotal movement of the handle (110) about the pivot axis in a second direction in response to exercise of said step of urging;
   e) including linkages (156, 140) interconnecting the handle (110) with each of the straps (64, 66) and where said steps of pivoting and accommodating include the step of translating the linkages (156, 140) in opposite directions; and
   f) gripping the hunting bow (22) with the U-shaped uprights (60, 62) as a result of exercise of said step of accommodating.

3. A rack (20) mountable on a vehicle (10) for supporting and releasing a piece of equipment (22), said rack (10) comprising in combination:
   a) a tube (26);
   b) a pair of stanchions (23, 24) extending from said tube (26) for attaching said rack to the vehicle (26);
   c) a pair of U-shaped uprights (60, 62) extending from respective rotatable straps (64, 66) for receiving, retaining and releasing the piece of equipment (22) and wherein each of said U-shaped uprights (60, 62) includes a pair of arms and a sleeve (176) disposed about each of said arms;
   d) a rubber strap (88) in tension for urging rotation of each said straps (64, 66) in opposite directions toward a first position, said rubber strap (88) extending along said tube (26) into engagement with and between one end of each of said straps (64, 66); and
   e) a pivotable handle (110) including a pivot axis and linkages (156, 140) extending from said handle (110) on opposed sides of said pivot axis for interconnecting said handle (110) with each of the other ends of said straps (64, 66) for rotating said straps (64, 66) toward a second position to accommodate placement of the piece of equipment (22) into said U-shaped uprights (60, 62) and to accommodate removal of the piece of equipment (22) from within said U-shaped uprights (60, 62).

* * * * *